United States Patent Office 3,267,107
Patented August 16, 1966

3,267,107
3-(4'-5'-METHYLENEDIOXY-PHENYL)-7,8-DI-METHOXY-1,2,3,4-TETRAHYDROISOQUI-NOLINES
Istvan S. Sallay, Wynnewood, Pa., assignor to American Home Products Corporation, New York, N.Y., a corporation of Delaware
No Drawing. Filed Sept. 17, 1964, Ser. No. 397,272
7 Claims. (Cl. 260—287)

This application is a continuation-in-part of application Serial No. 236,444, filed November 8, 1962, and now abandoned.

This invention relates to dimethoxy-isoquinoline compounds. More particularly this invention relates to new 3-(2'-alkyl-4',5'-methylenedioxy-phenyl)-7,8-dimethoxy-1,2,3,4-tetrahydroisoquinoline compounds and to the methods by which such compounds are prepared.

The compounds of this invention may be represented by the following structural Formula I

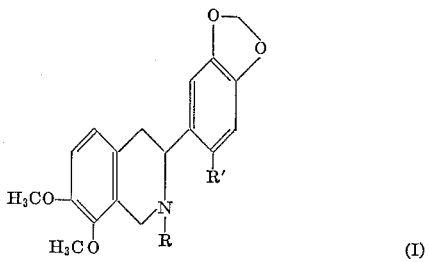

wherein R represents —CN and —CONH$_2$ and R' represents lower alkenyl, halo-lower alkyl, di-lower alkyl-amino-lower alkyl, and the quaternary ammonium halides thereof.

A preferred group of compounds within the class represented by Formula I constitutes those represented by the following structural Formula II

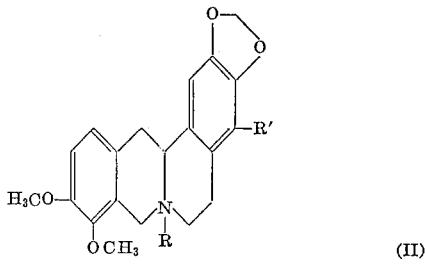

wherein R represents —CONH$_2$ and —CN and R' represents —(CH$_2$)$_2$Br, —(CH$_2$)$_2$N(C$_2$H$_5$)$_2$ and

—(CH$_2$)$_2$N$^+$(C$_2$H$_5$)$_3$I$^-$

The method of synthesizing the compounds described above is also a feature of the present invention. The compounds represented by Formula I may be prepared by reacting tetrahydroberberine represented by the Formula III

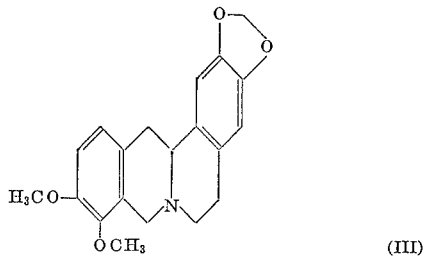

with a cyanogen halide, preferable cyanogen bromide, in approximately equimolar amounts, in the presence of an inert solvent such as benzene or chloroform under reflux. The tetrahydroberberine represented by Formula III above is prepared by the sodium borohydride reduction of berberine chloride as described by R. Mirza, J. Chemical Soc. 1957, 4400.

Certain of the new compounds of the present invention encompassed within those defined by Formula II are useful for their valuable pharmacological properties as specifically identified below. The remainder of the compounds encompassed within Formula II are useful as intermediates in the production of those final products having the valuable properties referred to. In the examples which follow it will be noted that the compounds of the present invention are identified by number as well as by their proper name. Compound 1 is useful primarily as an intermediate in the preparation of compounds 3, 9 and 10. Compound 3 is in itself useful as an intermediate in the preparation of compounds 4, 5 and 8. Compounds 4 and 8 are useful for their anti-convulsant and analgesic properties. Compound 5 which is preparable from compound 3 is primarily useful as an intermediate in the preparation of compound 6. The latter compound together with compounds 9 and 10 possess properties similar to compounds 4 and 8, with compound 9 being the more effective for the purposes identified. Compound 8 is further useful in that it possesses properties which make it effective as a tranquilizer.

When the final reaction products 4, 6, 8 and 9 are used for the purposes indicated they may be administered in therapeutic dosage amounts such as 10 to about 100 mg./k., either orally or parenterally in the form of tablets, capsules and the like as desired. When so used these compounds may be appropriately combined with liquid or solid carriers according to conventional pharmaceutical practice. When the compounds are combined with such carriers coloring, sweetening and other compatible non-toxic agents may be combined therewith.

Reference to the specific examples which follow will provide a better understanding of the novel compounds of the present invention and the manner in which the same are prepared.

*Example I*

To 20.4 g. of tetrahydroberberine (6 cmole) dissolved in 1500 ml. of benzene 6.66 g. of cyanogen bromide (6.05 cmole) was added. The reaction mixture was refluxed for 24 hours and after cooling 6.65 g. of tetrahydroberberine-hydrobromide was recovered. The benzene mother liquor was then extracted with diluted hydrochloric acid.

The benzene solution, free from unreacted tetrahydroberberine, was washed with water until acid free, dried and evaporated to dryness. The gummy residue was dissolved in dichloromethane and chromatographed on Florisil (200 g.).

The first fraction (600 ml.) produced 2-cyano-3-(2'-β-bromoethyl-4',5'-methylenedioxy-phenyl)-7,8-dimethoxy-1,2,3,4-tetrahydroisoquinoline (identified hereafter as compound 1), which was recrystallized from ethanol yielding 3.87 g. A sample of compound 1 was again recrystallized from ethanol, M.P. 174.5–175.5° C. (Found: C, 56.83; H, 4.79; N, 6.04; Br, 17.80. C$_{21}$H$_{21}$O$_4$N$_2$Br requires: C, 56.64; H, 4.75; N, 6.29; Br, 17.95%.) Infrared spectrum had bands at 3.45μ (CH), 4.55μ (—CN).

The second fraction (650 ml.) of the eluate resulted in a gummy material which, after recrystallization from ethanol, gave 1.25 g. of crystalline mixture, M.P. 155–190° C. This was a mixture of compound 1 and 7-cyano-9,10-dimethoxy-2,3-methylenedioxy-13,14-didehydro-7,14-des-dihydroberberine (compound 2).

The third fraction (2 l.) of the eluate produced 5.8 g. crystalline compound 2, M.P. 214–216° C. After recrystallization from acetone it had a M.P. 216.5–217.5° C. (Found: C, 69.11; H, 5.41; N, 7.30. $C_{21}H_{20}N_2O_4$ requires: C, 69.21; H, 5.53; N, 7.59%.) Infrared spectrum showed a band at 4.53μ (—CN).

*Example II*

1.5 g. of compound 1 (3.45 mmole) was dissolved in a mixture of 20 ml. of dimethylamine and 80 ml. of chloroform. The reaction mixture refluxed for 3 hours and the resulting yellow solution evaporated to dryness. The gummy residue was ground under ether. The resulting crystals (0.53 g.=33.5%) had a M.P. 150–165° C. After recrystallization from ethanol, they melted at 172–174° C. Infrared and the melting point of the material are identical with those of compound 1.

The combined ethereal extracts were washed with water, but when diluted hydrochloric acid was added 0.6 g. of crystals of 2-cyano-3-(2'-β-diethylaminoethyl-4',5'-methylenedioxy-phenyl)-7,8-dimethoxy-1,2,3,4-tetrahydroisoquinoline hydrochloride formed which after recrystallization from acetone, had a M.P. 202–204° C. (Found: C, 63.21; H, 7.30; N, 8.54; Cl, 7.29.

$C_{25}H_{32}O_4N_3Cl$ requires: C, 63.34; H, 6.81; N, 8.87; Cl, 7.48%.)

The free base of the above hydrochloride was liberated by suspending the salt in ether and shaking it with diluted sodium hydroxide. The combined ether layers were washed with water, dried and evaporated to dryness. The glassy residue was covered with a small amount of methanol. The separated crystals of 2-cyano-3-(2'-β-diethylaminoethyl-4',5'-methylenedioxy-phenyl)-7,8-dimethoxy-1,2,3,4-tetrahydroisoquinoline (hereafter referred to as compound 3) had a M.P. 127–128° C. (Found: C, 68.63; H, 7.05; N, 9.72. $C_{25}H_{31}O_4N_3$ requires: C, 68.63; H, 7.14; N, 9.60%.) Infrared spectrum possessed the expected band at 4.55μ (—CN).

*Example III*

9.3 g. of Compound 3 (2.1 cmole) was dissolved in 125 ml. of acetone and 4.25 g. (2.7 cmole) of ethyliodide added. 6.46 g. of the ethiodide of 2-cyano-3-(2'-β-diethylaminoethyl-4',5'-methylenedioxy-phenyl)-7,8-dimethoxy-1,2,3,4-tetrahydroisoquinoline (compound 5) separated out, M.P. 246–248° C. (Found: C, 54.86; H, 6.21; I, 21.00. $C_{27}H_{36}O_4N_3I$ requires. C, 54.66; H, 6.12; I, 21.38%.)

3.0 g. of compound 5 (5 mmole) was suspended in 200 ml. of hot water and 0.63 g. Ag₂O (2.6 mmole) added. The warm suspension was shaken until the filtrate was iodide-free. The filtrate was evaporated to dryness and the residue extracted with hot ethanol. From the colorless filtrate, stout prisms of 2-cyano-3-(2'-vinyl-4',5'-methylenedioxy-phenyl)-7,8-dimethoxy-1,2,3,4-tetrahydroisoquinoline (compound 6) deposited, M.P. 165–167° C. (Found: C, 69.03; H, 5.34; N, 7.78. $C_{21}H_{20}O_4N_2$ requires: C, 69.21; H, 5.53; N, 7.69%.) Infrared spectrum possessed a band at 4.55μ (—CN).

*Example IV*

A solution of 3.71 g. of compound 3 in 250 ml. of 10% NaOH (ethanol:water=1:1) was refluxed for 24 hours. The reaction mixture was evaporated in vacuo to one half volume and was extracted with ether. The combined ethereal extracts were washed, dried, and evaporated to dryness. A colorless oil (3.1 g.=96.3%) was obtained, which product 2-carbamoyl-3-(2'-β-diethylaminoethyl-4',5'-methylenedioxy-phenyl)-7,8-dimethoxy-1,2,3,4-tetrahydroisoquinoline (compound 4) was then recrystallized from 50 ml. of n-hexane. Compound 4 (0.11 g.) was insoluble in the above solvent and was twice recrystallized from chloroform/petrol-ether. The analytically pure compound 4 had a M.P. 149.5–151° C. (Found: C, 66.17; H, 7.44; N, 9.08. $C_{25}H_{33}O_5N_3$ requires: C, 66.05; H, 7.03; N, 9.24%.) Infrared spectrum showed bands at 3.0μ (amide NH), 3.40μ (CH), 5.98, 6.20μ (amide >C=O), but no —CN at 4.55μ.

From the above 50 ml. of n-hexane, 2.11 g. of 3-(2'-β-diethyl aminoethyl-4',5'-methylenedioxy-phenyl)-7,8-dimethoxy-1,2,3,4 tetrahydroisoquinoline (compound 8) separated out; M.P. 82–84° C. One recrystallization from n-hexane resulted in silky needles; M.P. 85–86° C. (Found: C, 70.01; H, 7.85; N, 6.60. $C_{24}H_{32}O_4N_2$ requires: C, 69.87; H, 7.82; N, 6.79%.)

The bis-hydrochloride of compound 8 was prepared in methanol containing dry hydrochloric acid. After evaporation of the methanol, the oil could be brought into solid form by triturating with acetone. Recrystallized from ethanol-ether; M.P. 240–242° C. (dec.). Found: C, 59.19; H, 7.07; N, 5.89; Cl, 14.50. $C_{24}H_{34}O_4N_2Cl_2$ requires: C, 59.38; H, 7.06; N, 5.77; Cl, 14.61%.)

*Example V*

A suspension of 1.82 g. (5 mmole) of compound 2 in 100 ml. of 10% NaOH (ethanol:water=1:1) was refluxed for 24 hours. Crystalline material (1.88 g.=96.7%) which separated out was filtered off and had a M.P. 247–248° C. The crude product of 7-carbamoyl-9,10-dimethoxy-2,3-methylenedioxy-13,14-didehydro-7,14-des 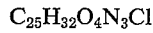 dihydroberbine (compound 7) was recrystallized from ethyleneglycol monomethylether; M.P. 247–247.5° C. (Found: C, 66.03; H, 5.96; N, 7.23. $C_{21}H_{22}O_5N_2$ requires: C, 65.95; H, 5.80; N, 7.32%.) The infrared spectrum had the expected maxima at 2.93μ (amide NH), 3.45μ (CH), 5.95, 6.20μ (amide >C=O).

*Example VI*

2.23 g. of compound 1 (5 mmole) was refluxed in 100 ml. of 10% NaOH (ethanol:water=1:1) for 24 hours. The reaction mixture was evaporated in vacuo to one half volume. It was then extracted with ether and the combined ethereal extracts washed with water. After drying and evaporation, a solid foam (1.7 g.) was obtained. The residue was refluxed with 60 ml. of n-hexane and filtered off. Colorless rosettes of 3-(2'-vinyl-4',5'-methylenedioxy-phenyl)-7,8-dimethoxy-1,2,3,4-tetrahydroisoquinoline (compound 9) (1.06 g.) were isolated; M.P. 103–104.5° C. (Found: C, 79.90; H, 6.02; N, 3.97. $C_{20}H_{21}O_4N$ requires: C, 70.78; H, 6.24; N, 4.13%.) Infrared spectrum had a weak band at 3.05μ (secondary NH), but no band at 4.55 μ (—CN) was observed.

The solid residue (140 mg.) which was insoluble in hexane, was recrystallized from ethanol and yielded 80 mg. of rock-salt-like crystals of 2-carbamoyl-3-(2'-vinyl-4',5'-methylenedioxy-phenyl)-7,8-dimethoxy-1,2,3,4-tetrahydroisoquinoline (compound 10); M.P. 192–194° C. Infrared spectrum showed the expected bands at 2.91μ (amide NH), 3.50μ (CH), 6.00, 6.25μ (amide >C=O).

*Example VII*

Tetrahydroberberine (III) (51 g.—0.15 mole) was refluxed in 3700 ml. of benzene with cyanogen bromide (15.9 g.—0.15 mole) for 24 hours. After cooling the reaction mixture, the hydrobromide of the starting material (21.2 g.=33.9%) was filtered off. The mother-liquor was extracted with diluted hydrochloric acid and the hydrochloride salt of I was isolated (7.16 g.=12.8%). The benzene layer was then washed with water, dried and evaporated to dryness. The pale yellow residue was refluxed in 1500 ml. of 10% NaOH (ethanol:water=1:1) for 24 hours. After cooling the reaction mixture, the crude compound 7 was filtered off (8.6 g.=15%); M.P. 208–214° C. After recrystallization from ethyleneglycol monomethylether, compound 7 melted at 247–248° C. Infrared spectrum showed bands at 2.93μ (NH), 6.0μ (amide >C=O).

The mother liquor of the crude compound 7 was evaporated to half of its volume and extracted with ether. The combined ethereal extracts were washed with water, dried and evaporated to dryness. A solid foam was obtained (20 g.=39.2%), which was triturated with 60 ml. of ether. A second crop of compound 7 (10 g.=17.5%), which did not go into the solution was filtered off. The ethereal solution of compound 7 was chromatographed on Florisil (200 g.), prepared and eluted with ether (750 ml.). A colorless, solid foam of compound 7 (7.0 g.=13%) was obtained. For further purification the foam was recrystallized from n-hexane, obtaining 6.1 g. of compound 9 in the foam of shiny prisms; M.P. 103–104° C. (Found: C, 70.70; H, 6.13; N. 4.02. $C_{20}H_{21}O_4N$ requires: C, 70.78; H, 6.24; N, 4.13%.) Infrared spectrum possessed the expected band at $3.06\mu$ (NH), with no band at $4.55\mu$ (—CN).

A sample of the free base of compound 9 was dissolved in methanol and treated with an ethereal solution of dry hydrogen bromide. The colorless precipitate was collected and recrystallized from ethanol. The long needles had a M.P. 233–334° C. (Found. C, 57.14; H, 5.14; N, 3.21. $C_{20}H_{22}O_4NBr$ requires: C, 57.15; H, 5.27; N, 3.33%.)

The foregoing examples serve to illustrate the compounds of the present invention and the methods by which they are prepared. Nothing set forth herein should be construed as a limitation on the scope of this invention. The latter is to be limited only by the claims appended hereto.

What is claimed is:

1. A compound selected from the group represented by the formula

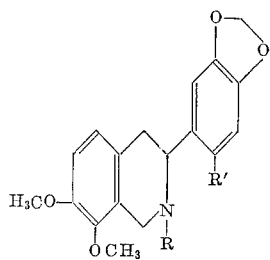

in which R is selected from the group consisting of —$CONH_2$ and —CN and R' is selected from the group consisting of —$(CH_2)_2N(C_2H_5)_2$ and —$(CH_2)_2Br$.

2. 2 - cyano - 3-(2'-β-bromoethyl-4',5'-methylenedioxyphenyl)-7,8-dimethoxy-1,2,3,4-tetrahydroisoquinoline.

3. 2 - cyano-3-(2'-β-diethylaminoethyl-4',5'-methylenedioxy-phenyl)-7,8-dimethoxy - 1,2,3,4 - tetrahydroisoquinoline.

4. 2 - carbamoyl - 3-(2'-β-diethylaminoethyl-4',5'-methylenedioxy-phenyl)-7,8 - dimethoxy - 1,2,3,4 - tetrahydroisoquinoline.

5. A method which comprises reacting tetrahydroberberine with cyanogen bromide in approximately equimolar amounts in the presence of an inert solvent selected from the group consisting of benzene, acetone and chloroform under reflux for a period of about 24 hours to produce 2-cyano-3-(2'-β-bromoethyl-4',5'-methylenedioxyphenyl)-7,8-dimethoxy-1,2,3,4-tetrahydroisoquinoline.

6. The method of preparing 2-cyano-3-(2'-vinyl-4',5'-methylenedioxy - phenyl) - 7,8 - dimethoxy-1,2,3,4-tetrahydroisoquinoline which comprises reacting 2-cyano-3-(2'-β - diethylaminoethyl - 4',5'-methylenedioxy-phenyl)-7,8-dimethoxy-1,2,3,4-tetrahydroisoquinoline with ethyl iodide in an inert solvent selected from the group consisting of benzene, acetone and chloroform to produce the ethiodide of 2-cyano-3-(2'-β-diethylaminoethyl - 4',5' - methylenedioxy - phenyl) - 7,8-dimethoxy-1,2,3,4-tetrahydroisoquinoline, suspending the recovered ethiodide compound in hot water and adding silver oxide thereto, shaking the suspension until the filtrate is iodide free, evaporating the filtrate to dryness, extracting the residue with ethanol and recovering the desired product from the filtrate.

7. A method which comprises reacting tetrahydroberberine with cyanogen bromide in approximately equimolar amounts in the presence of an inert solvent selected from the group consisting of benzene, acetone and chloroform under reflux for a period of about 24 hours to produce an intermediate 2-cyano-3-(2'-β-bromethyl-4',5'-methylenedioxy - phenyl) - 7,8-dimethoxy-1,2,3,4-tetrahydroisoquinoline; separating said intermediate chromatographically; reacting the bromocyanide intermediate with dimethylamine; and following by treatment with dilute hydrochloric acid to yield 2-cyano-3-(2'-β-diethylaminoethyl - 4',5' - methylenedioxy-phenyl)-7,8-dimethoxy-1,2,3,4-tetrahydroisoquinoline hydrochloride.

References Cited by the Examiner

Elderfield et al., J. Org. Chem., vol. 17, pp. 431–441 (1952).

Fieser and Fieser, "Advanced Organic Chemistry," Reinhold, 1961, pp. 494–5, 519–20 relied on.

ALEX MAZEL, *Primary Examiner.*

NICHOLAS S. RIZZO, *Examiner.*

DONALD G. DAUS, *Assistant Examiner.*